Sept. 18, 1951  S. A. CAMPAGNA ET AL  2,568,271
ADAPTER SADDLE FOR VEHICLE HOIST
Filed Feb. 7, 1949
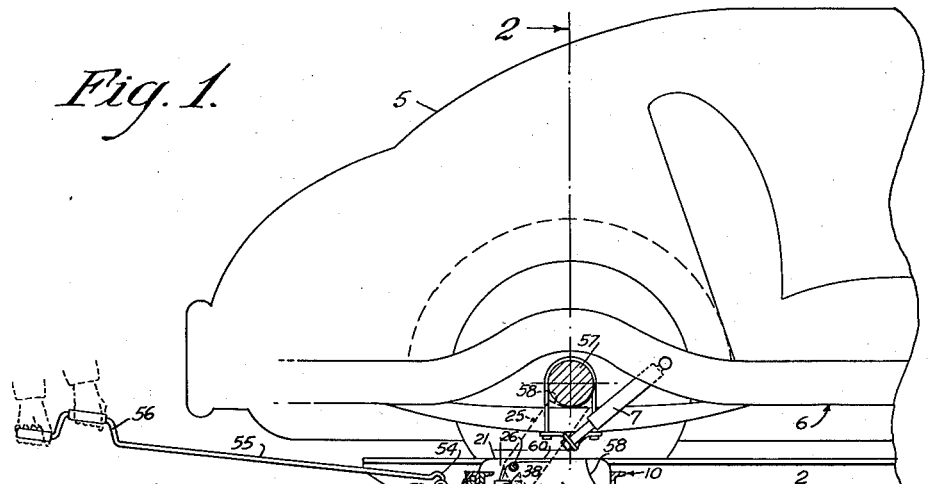
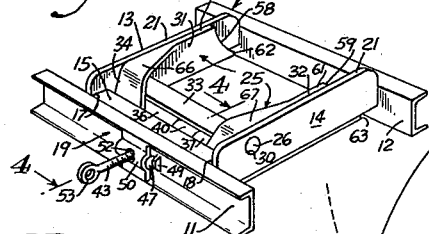
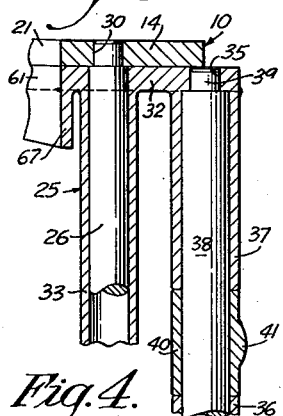
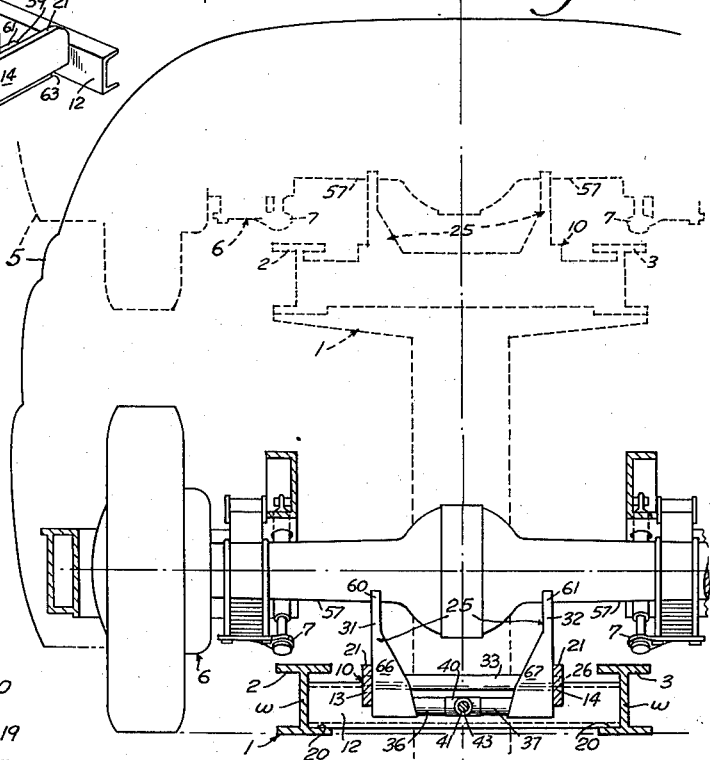
INVENTOR.
Salvatore A. Campagna
and Vincent J. Campagna
By Leslie M. Hansen
THEIR ATTORNEY Patented Sept. 18, 1951

2,568,271

UNITED STATES PATENT OFFICE 2,568,271

ADAPTER SADDLE FOR VEHICLE HOIST

Salvatore A. Campagna and Vincent J. Campagna, San Jose, Calif.

Application February 7, 1949, Serial No. 75,035

11 Claims. (Cl. 254—89)

This invention relates to hoists for automotive vehicles and more particularly to an adapter saddle so constructed as to accommodate conventional hoists for use with substantially all types and models of automotive vehicles.

The hoist with which the adapter saddle of the present invention is most suitably employed is the parallel rail type associated with one or more vertically disposed hydraulic lifts. In such types of lifts the rails extend in a horizontal plane parallel to the fore to aft axis of a vehicle so as to be straddled by the wheels of such vehicle, that is with the rails disposed between them.

Heretofore individual axle jacks have been provided for separate attachment to the lift bars or rails of vehicle hoists, but due to recent developments in design and the extremely low disposition of some parts of present day vehicles it has become difficult and in most cases impossible to employ these prior known types of axle jacks for the purpose for which they were intended.

It is an object of the present invention to provide an adapter saddle which in its inoperative position is confineable within the horizontal and vertical limits of the rails of conventional vehicle hoists so as to eliminate obstruction of passage of the vehicle over the rails during placement of a vehicle over the hoist.

Another object is to provide a vehicle hoist accessory with a saddle arm adapted to move from inoperative to operative position through a plane parallel to the fore to aft axis of a vehicle disposed to be lifted by the hoist.

Another object is to provide a vehicle hoist accessory adapted to be adjusted from inoperative to operative position in a simple and facile manner.

Yet another object is to provide an adapter saddle for vehicle hoists which is simple in construction, easily operated and economical to manufacture.

Other objects and advantages will become apparent from the following description when read in the light of the drawings in which:

Fig. 1 is a partial longitudinal section showing the adapter saddle embodying the present invention.

Fig. 2 is a transverse section of Fig. 1 and is taken along line 2—2 thereof.

Fig. 3 is a perspective view of the adapter saddle embodying the present invention.

Fig. 4 is an enlarged fragmentary section of Fig. 3 taken along line 4—4 thereof.

Fig. 5 is a partial section of Fig. 4 taken along line 5—5 thereof and at a slightly reduced scale with respect thereto.

For purposes of illustration the device constituting the present invention has been shown in the drawings in use with one well-known type of hoist 1. This hoist consists of a pair of rails 2 and 3 commonly known as I or H shapes suitably secured in spaced relation by a cross beam, not shown, by which the rails are operatively connected to a cylindrical ram 4 shown in dotted lines in Fig. 2.

The rails 2 and 3 are disposed in parallelism in a common horizontal plane and are normally disposed to rest upon a surface constituting the floor level of a garage or service station wherein the hoist is located. These rails are usually limited in height to the maximum floor clearance possible with any one of the makes of automobiles on the market. To be specific these rails are seldom more than five inches high because otherwise in driving a car or automotive vehicle over them there would be a danger of some part of the vehicle scraping along the rails.

An example of the limitations in floor clearance is shown in Figs. 1 and 2 by the outline of the body 5 and illustration of the under carriage 6 of a well-known make of automobile of present day design. The trend has been toward lowering the body and chassis to such extent that it is obviously no longer possible for a man to crawl beneath and to work upon the under carriage from floor level. Moreover, the under carriages of late model cars are so designed that there are obstructing appendages or instrumentalities such as the shock absorbers 7 which overlie and are so disposed relative to the adjacent rails as to prevent insertion of a saddle beneath them. In this connection, note in Figs. 1 and 2 how close the lower ends of the shock absorbers are to the top surfaces of the rails. From this it is apparent that saddles adapted to swing in a plane transverse to the long axis of the car would be obstructed from moving into an erect position by reason of the proximity of the shock absorbers 7 relative to the top face of the rails.

The adapter saddle of the present invention, as best shown in Fig. 3, comprises a frame 10 made up of upstanding channels 11 and 12 parallelly disposed and spaced from each other by vertical side plates 13 and 14 also parallelly disposed but transversely relative to the channels. The back faces of the channels 11 and 12 are welded to the respective ends of the side plates 13 and 14 and an auxiliary channel 15 is welded with its back face 16 in abutting relation with the channel 11. The ends 17 and 18 of the auxiliary channel 15 are each welded to the respective side plates 13 and 14 to brace them thereby rigidifying the channel 11 and providing a stress bar 19 for reasons later to become apparent.

At this point it should be noted that the channels 11 and 12 are of a length sufficient to bridge, i. e. extend between the webs w of the hoist rails 2 and 3 and to rest upon the upper surfaces 20 of the innermost lower flanges of such rails. Consequently, the frame 10 is easily inserted at either open end of the hoist rails and is movable along the same into any desired position. It should also be noted that the side plates 13 and 14 are elevated slightly relative to the plane in which the channels lie and that the upper edges 21 of the plates are preferably disposed in the same horizontal plane as the top surfaces of the hoist rails 2 and 3 in the manner as clearly illustrated in Figs. 1 and 2. In other words, the frame 10 when mounted between the hoist rails is confined within the height thereof, does not extend above the top surfaces of the rails 2 and 3 and therefore will create no obstruction above the rails.

A saddle 25 is arranged between the side plates 13 and 14 and is pivotally mounted on a shaft 26, the reduced ends of which are mounted in holes 30, provided in the respective side plates 13 and 14. The saddle 26 comprises spaced arms 31 and 32 each disposed for swinging movement adjacent its respective side plates 13 and 14. These arms 31 and 32 are joined for unitary movement by a bearing sleeve 33 having its ends suitably secured to the respective arms by welding, Fig. 5. The shaft 26 extends through the sleeve 33 and is disposed somewhat forwardly of but adjacent to the stress bar 19, as is clearly shown in Fig. 4.

The rearmost edges 34 of the arms 31 and 32 extend rearwardly and downwardly toward their lowermost extremities and are each provided with a bearing hole 35 a substantial radial distance from the pivotal axis of the arms. Each arm 31 and 32 is provided with a sleeve hub 36 and 37, respectively, which fits over a stress rod 38, the reduced ends 39 of which extend into the bearing holes of the respective arms 31 and 32.

Mounted for swinging movement on the stress rod 38 between the inner ends of the sleeve hubs 36 and 37 is an elongated collar 40 by which the sleeve hubs are spaced from each other. Secured to this collar 40, as by welding, is a boss 41 having an axial opening 42 through which one end of a screw 43 extends. The boss 41 is provided with an inner shoulder 44 against which a retaining ring 45 is adapted to bear. The ring 45 is secured to the reduced end of the screw 43 by peening the end of the screw or by welding the reduced end thereof to the ring 45. The arrangement is such that the screw is free to rotate within the opening 42 of the boss 41 so that the end of the screw can bear against the periphery of the collar 40 to urge the saddle 25 in one direction about its pivotal axis or so that the retaining ring 45 can bear against the shoulder 44 to pull the saddle 25 in an opposite direction relative to its pivotal support. In this connection it should be noted that the stress rod 38 travels in an arc which is coincident to a curve cut by a chord lying along the axis of the screw 43.

The screw 43 extends through an elongated slot 46 provided in the stress bar 19 and is threadedly connected to a cylindrical billet 47 by way of a diametrically extending threaded bore 48 therein. The billet is held against endwise movement by a lug 49 secured to the web of channel 11 at either side of the billet. The billet is held in place by a strap 50 having its ends secured to the flanges of the channel 11. This strap is provided with a circular seat 51 to permit rocking of the billet in trunnion fashion about its cylindrical axis and the strap is further provided with an elongated slot 52 to permit the extension of the screw 43 rearwardly of the stress bar 19.

The outer extremity of the screw 43 is in the form of an eye 53 through which the end 54 of a crook 55 may be hooked for turning the screw. The opposite end of the crook is in the form of a hand operated brace 56 for manipulating the screw from a point remote from under the car to be hoisted. In this connection it should be noted that the crook 55 is also useful in moving the frame 10 along the hoist rails 2 and 3 for positioning the adapter saddle relative to that part of the vehicle which it is to engage.

For the purpose of providing a cradle adapted to receive the rear axle 57 of the vehicle, the free edges 58 and 59 of the arms 31 and 32, respectively, are of concave shape. The concave edges 58 and 59 are struck about a center which is slightly above the upper edge 60 and 61 of the respective arms 31 and 32. For this reason the upper edges of the arms are shorter than the distance from the center of the shaft 26 to the lowermost tip 62 and 63 of the respective arms. Consequently, upon movement of the arms 31 and 32, counter clockwise Fig. 1 about the axis of shaft 26, the radius of swing of the upper edges 60 and 61 of the arms is such as to pass the axle of the vehicle whereas the tips 62 and 63 being a greater distance from shaft 26 cause the concave edges 58 and 59 of the arms to engage the lower wall of the housing of the rear axle 57.

The foregoing pivotal movement of the saddle 25 is accomplished by turning the screw 43 in one direction by operation of the brace 56 to cause the screw to advance relative to the billet 47 for extension further beyond the forward face of the stress bar 19. This advancement of the screw causes its inner end to bear against the collar 40 whereupon the thrust of the screw is transmitted through the stress rod 38 and sleeve hubs 36 and 37 to the respective arms 31 and 32 of the saddle 25. The screw and billet rockably anchored to the stress bar comprise a means for exerting great pressure upon the stress rod relative to the substantially fixed stress bar in the manner of a mechanical jack.

In the foregoing manner, the conventional hoist 1 is adapted to accommodate any of the late model automobiles although they may have obstructing appendages overlying the hoist rails. In other words, since the saddle 25 is normally disposed within the frame 10, i. e. the space bounded by the outside dimensional limits of the hoist rails, there is no danger of any part of the vehicle striking the saddle when the vehicle is driven onto the hoist in an otherwise proper manner. Moreover, since the saddle 25 is constructed to swing in a plane parallel to the long axis of the vehicle, there is little probability that it is likely to be obstructed by any appendages of the vehicle incident to engagement of the concave edges 58 and 59 of the arms 31 and 32 with the rear axle housing of the vehicle.

With the rear axle of the vehicle so seated in the cradle provided by the concave edges 58 and 59 of the saddle, the vehicle can now be raised into the dotted line position, Fig. 2, in the conventional manner. The load of the vehicle on the arms 31 and 32 is transmitted to the side plates 13 and 14 via the pivot shaft 26 and is also transmitted to the stress bar 19 via the sleeve hubs 36—37, stress rod 38, collar 40, screw 43 and billet 47 to assure distribution of the load to the frame 10.

It should here be noted that the sleeve hubs 36—37 of arms 31 and 32 are provided wtih additional bracing by triangular webs 66—67 respectively. Each of these webs is welded adjacent its base to the respective sleeve hub and along its altitudinal side to the rearward edge 34 and the adjacent upper edge 60 or 61 of the respective arm 31 or 32. Consequently, any excessive thrust on the arms 31—32 is directed toward the collar 40 and thence directly to the stress bar 19 and lateral distortion of the arms prevented.

From the frame 10 the load is equally distributed to the four points of support of the frame on the lower flanges of the hoist rails and the vehicle is accordingly maintained in a stable position while elevated with the rails.

While we have shown one specific form of construction in the foregoing disclosure, it will be apparent to those skilled in the art that variations in form and modifications of construction may be made without departing from the spirit of the invention. We therefore desire to avail ourselves of all modifications, variations and alterations in structure coming within the scope of the appended claims.

What we claim to be our invention and desire to protect by Letters Patent is:

1. In a vehicle hoist having parallel flanged rails of limited height and spacing, a device for adapting said rails for connection to a vehicle straddling them comprising a frame having four-point suspension on the innermost lower flanges of said rails, a saddle pivotally mounted on said frame for swinging movement in a plane parallel to the fore to aft axis of said vehicle, said saddle having a pair of arms normally extending in a plane parallel to said rails, a jack including a base and an extensible means between said frame and said saddle for moving the latter relative to its pivotal mounting for causing said arms to extend above the upper limits of said rails into engagement with the undercarriage of a vehicle straddling the rails, and manually controlled means for optionally extending or shortening the extensible means of said jack relative to the base thereof.

2. In a vehicle hoist having lift rails of limited height and spacing, a device for accommodating said rails for lifting connection to a vehicle to be hoisted, comprising a saddle consisting of parallel arms normally adapted to extend parallel to said rails, frame means for pivotally mounting said saddle in the foregoing position relative to said rails for movement into supporting engagement with the axle of the vehicle to be hoisted, a stress member carried by said saddle for movement therewith in an arc which is chordally coincident to a line substantially parallel to the fore to aft axis of the vehicle to be hoisted, a jack screw having extensible means pivotally connected to said stress member and a base anchored to said frame, and means for manually operating said jack screw for optionally lengthening or shortening the extensible means thereof from the base toward said stress member for pivoting said saddle toward and from supporting engagement with a vehicle disposed over said rails.

3. In combination a vehicle hoist having parallel flanged rails limited in height and spacing, a device for adapting said rails for limiting connection with a vehicle to be lifted thereby comprising a frame supported for sliding movement on the inwardly extending lower flanges of said rails, a saddle pivotally mounted on said frame and adapted to be confined within said frame when in an inoperative position, said frame providing a stress bar adjacent the pivotal axis of said saddle, a trunnion on said stress bar, a stress rod carried by said saddle a substantial radial distance from and below the pivotal axis thereof, means for connecting said trunnion to said stress rod, and means for forcibly extending said connecting means from said trunnion toward said stress rod for swinging said saddle in a plane parallel to said rails for supporting engagement with a vehicle disposed above them.

4. The combination with a vehicle hoist having lifting rails of limited height and spacing of a device for accommodating said rails for lifting a vehicle to be hoisted comprising a frame connected to said rails, a shaft supported on said frame transversely of the vehicle to be hoisted, a saddle having a cradled end adapted to seat against the axle of the vehicle and its opposite end mounted on said shaft in proximity of the upper edge of said saddle, a stress bar on said saddle parallel to said shaft and radially spaced therefrom for arcuate movement relative thereto, extensible means bearingly connected to said arcuately moveable stress bar and an adjacent relatively fixed wall of said frame, means for forcibly elongating said extensible means for movement from said relatively fixed wall toward said stress bar to thereby swing said saddle into a position wherein the cradled end thereof seats against the axle of the vehicle to be hoisted, and means for shortening said extensible means for lowering said cradle into substantial parallelism with said rails.

5. An adapter saddle for vehicle hoists of the spaced rail type comprising a pair of spaced members extending transversely of said rails for sliding movement between their upper and lower flanges, a pair of spaced plates having their ends secured to said spaced members to provide a rigid frame, means cooperating with one of said spaced members for providing a stress bar between said plates, a saddle arranged between said plates and having pivotal connection therewith adjacent said stress bar and the upper margins of said plates, said saddle including a pair of arms normally disposed in parallelism with said plates, a stress rod carried by said arms in a region below the pivotal connection of said saddle with said plates, extensible means having one end thereof pivotally connected to said stress rod and its opposite end operatively engaging said stress bar, and manually controlled means for optionally lengthening and shortening said extensible means whereby to move the free ends of said arms toward or away from the undercarriage of a vehicle to be lifted by said hoist.

6. In combination with a hoist for automotive vehicles of the parallel flanged rail type, an adapter saddle comprising a frame arranged for sliding movement between said rails on the upper surfaces of the innermost lower flanges thereof, a pair of arms pivotally mounted adjacent their upper and their rearmost edges on said frame for swinging movement in a plane parallel to the extended rails, means for uniting said arms for joint movement, said arms having their ends remote from their pivotal mounting cut on an arc struck from a point slightly exteriorly of the upper edges of said arms so that said arms are shorter along their upper edges than along their lower edges, a stress bar secured to said arms adjacent their rearmost and their lower edges, extensible means anchored to said frame and having its inner end pivotally connected to said stress bar, and means for lengthening said extensible means to urge said stress bar through an arcuate path to thereby swing said arms above the upper limit of said rails for causing the arcuate ends of said arms to engage the axle housing of a vehicle disposed over said rails.

7. An adapter for vehicle hoists of the type employing spaced flanged rails, comprising a rigid frame supported for sliding movement along the innermost lower flanges of said rails, said frame including spaced plates extending parallel to said rails and confined to the altitudinal limits of said rails, said frame having a stress bar disposed transversely of said plates, a saddle disposed between said plates and pivotally connected thereto adjacent the upper edges thereof and adjacent said stress bar, said saddle including a pair of arms normally lying within the confines of said frame and having their free ends formed to provide a cradle movable upwardly upon swinging movement of said saddle upwardly from said frame into supporting position relative to the axle of a vehicle disposed over said rails, a stress rod carried by said saddle adjacent said stress bar and in parallelism therewith, extensible means mounted on said stress bar and having its inner end swivelly connected to said stress rod, and manually operated means for optionally extending or retracting said extensible means relative to said stress bar for urging said stress rod way from or pulling it toward said stress bar for swinging said saddle arms out of and into parallelism with said rails.

8. An adapter for vehicle hoists of the type employing spaced flanged rails, comprising a pair of spaced members extending transversely of said rails for sliding movement along the lower flanges thereof and within the altitudinal limits of said rails, a pair of spaced plates having their ends secured to said spaced members in transverse relation with respect thereto in a manner to be confined within the upper and lower limits of said rails, a saddle pivotally connected to said plates for swinging movement in a plane therebetween and about an axis more closely adjacent the upper edges of said plates, said saddle including a pair of arms having their free ends formed to provide an arcuate seat adapted to engage the axle housing of a vehicle to be lifted by said hoist, said arcuate seat being so disposed relative to said arms as to provide foreshortened upper edges thereon whereby said arms can swing into a position where the arcuate seat will underlie the axle housing of the vehicle, a stress bar carried by said saddle in parallelism with the pivotal axis thereof and in the region below the same, a trunnion pivotally mounted on one of said rails, a screw threadedly extending diametrically through said trunnion and having its inner end disposed adjacent said stress rod, means for swivelly connecting the inner end of said screw to said stress rod, and manually actuated means adapted for detachable connection with the outer end of said screw for controlling the extension and retraction thereof relative to said trunnion for causing said arms to swing toward and away from the axle housing of a vehicle disposed over said rails.

9. The combination with a vehicle hoist having spaced flanged rails of limited height, of a device for adapting said rails for lifting vehicles having obstructing appendages overlying and in proximity to said rails, comprising a frame slidably supported on the innermost lower flanges of said rails and confined to the altitudinal limits thereof, a saddle normally disposed within the confines of said frame and having a pair of arms provided with cradle-formed ends adapted to form a seat for the axle of a vehicle to be lifted, means adjacent the opposite ends of said arms for pivotally mounting said cradle to said frame for swinging movement in a plane parallel to the fore to aft axis of the vehicle to be lifted, and manually controlled extensible means pivotally connected to said saddle a substantial radial distance below said pivotal mounting thereof and having bearing connection with a wall of said frame which extends transversely of said rails for moving said saddle arms into and for holding them in a position wherein the cradle-formed ends thereof engage the axle of a vehicle to be lifted.

10. In a vehicle hoist having parallel flanged rails of limited height and spacing, a device for accommodating said rails for lifting engagement with a vehicle to be hoisted, comprising a frame bridging said rails but lying within the altitudinal limits thereof, a saddle having a cradle end adapted to engage the axle housing of a vehicle to be hoisted, means for pivotally mounting said saddle on said frame for swinging movement in a plane parallel to the rails, a jack having a base and an extensible arm, said jack having its base connected to said frame and its extensible arm bearing against said saddle at a radial distance from the latter's axis of pivotal connection with said frame, and manually controlled means for extending the extensible arm of said jack relative to the base thereof for swinging said saddle into a position in which its cradle end engages the axle housing of the vehicle to be hoisted.

11. The combination with a vehicle hoist having lifting rails of limited height and spacing of a device for accommodating said rails for lifting a vehicle to be hoisted comprising a frame connected to said rails, a shaft supported on said frame transversely of the vehicle to be hoisted, a saddle having a cradled end adapted to seat against the axle of the vehicle and its opposite end mounted on said shaft in proximity of the upper edge of said saddle, said saddle when in inoperative position being disposed substantially parallel to said rails, a stress bar on said saddle parallel to said shaft and radially spaced therefrom in a region below the same, extensible means having bearing engagement against said stress bar and pivotal connection with an adjacent wall of said frame, and means for forcibly elongating said extensible means for movement from said adjacent wall of said frame toward said stress bar to thereby swing said saddle into operative position wherein the cradle end thereof seats against the axle of the vehicle to be hoisted.

SALVATORE A. CAMPAGNA.
VINCENT J. CAMPAGNA.

REFERENCES CITED

The following references are of record in the file of this patent:

UNITED STATES PATENTS

| Number | Name | Date |
|---|---|---|
| 2,120,051 | Tully | June 7, 1938 |